US012182997B2

(12) United States Patent
Zeng et al.

(10) Patent No.: US 12,182,997 B2
(45) Date of Patent: Dec. 31, 2024

(54) INFORMATION PROCESSING DEVICE AND INDEX VALUE CALCULATION METHOD

(71) Applicant: OMRON Corporation, Kyoto (JP)

(72) Inventors: Xiangyu Zeng, Kyoto (JP); Atsushi Hashimoto, Tokyo (JP)

(73) Assignee: OMRON CORPORATION, Kyoto (JP)

( * ) Notice: Subject to any disclaimer, the term of this patent is extended or adjusted under 35 U.S.C. 154(b) by 387 days.

(21) Appl. No.: 17/621,368

(22) PCT Filed: Jun. 23, 2020

(86) PCT No.: PCT/JP2020/024554
§ 371 (c)(1),
(2) Date: Dec. 21, 2021

(87) PCT Pub. No.: WO2021/006029
PCT Pub. Date: Jan. 14, 2021

(65) Prior Publication Data
US 2022/0358641 A1    Nov. 10, 2022

(30) Foreign Application Priority Data

Jul. 11, 2019  (JP) ................................. 2019-129391

(51) Int. Cl.
*G06T 7/00* (2017.01)
(52) U.S. Cl.
CPC .. *G06T 7/0012* (2013.01); *G06T 2207/20021* (2013.01); *G06T 2207/30188* (2013.01)
(58) Field of Classification Search
None
See application file for complete search history.

(56) References Cited

U.S. PATENT DOCUMENTS 6,683,970 B1     1/2004  Satake
10,115,187 B2 *  10/2018 Young ....................... G06T 7/90
(Continued)

FOREIGN PATENT DOCUMENTS

CN    101330823 A    12/2008
CN    102362294 A     2/2012
(Continued)

OTHER PUBLICATIONS

Extended European search report issued in European Appln. No. 20836386.1 mailed on May 17, 2023.
(Continued)

*Primary Examiner* — Vikkram Bali
(74) *Attorney, Agent, or Firm* — ROSSI, KIMMS & McDOWELL LLP

(57) ABSTRACT

An information processing apparatus calculates an accurate index for the growth state of a plant without increasing a user load. The apparatus includes a receiver that receives an input of a captured image obtained by capturing an image of a plant cultivation area including a rectangular area in a longitudinal direction of the rectangular area, a conversion factor calculator that calculates conversion factors at positions in a depth direction in the captured image by determining a pixel count in a width direction of the rectangular area in the captured image input into the receiver at each position in the depth direction and dividing an actual width of the rectangular area by the determined pixel count, and an index calculator that calculates an index for a growth state of the plant by analyzing the captured image using the conversion factors at the positions calculated by the conversion factor calculator.

4 Claims, 2 Drawing Sheets

(56) References Cited

U.S. PATENT DOCUMENTS

| | | | |
|---|---|---|---|
| 2009/0281733 | A1 | 11/2009 | Yamamoto et al. |
| 2012/0013616 | A1 | 1/2012 | Uesaki |
| 2017/0024876 | A1 | 1/2017 | Young et al. |
| 2019/0310184 | A1 | 10/2019 | Otani |

FOREIGN PATENT DOCUMENTS

| | | | |
|---|---|---|---|
| CN | 107237334 | A | 10/2017 |
| CN | 109564155 | A | 4/2019 |
| CN | 109977802 | A | 7/2019 |
| JP | 2001045867 | A | 2/2001 |
| JP | 2006320240 | A | 11/2006 |
| JP | 4026684 | B2 | 12/2007 |
| JP | 2008136411 | A | 6/2008 |
| JP | 5970751 | B2 | 8/2016 |
| JP | 6489604 | B2 | 3/2019 |
| JP | 2020024672 | * | 2/2020 |
| KR | 20170056728 | * | 5/2017 |

OTHER PUBLICATIONS

International Search Report issued in International Appln. No. PCT/JP2020/024554 mailed Sep. 24, 2020. English translation provided.
Written Opinion issued in International Appln. No. PCT/JP2020/024554 mailed Sep. 24, 2020. English translation provided.
Office Action issued in Chinese Appln. No. 202080045540.5 mailed Oct. 21, 2024. English translation provided.

* cited by examiner

INFORMATION PROCESSING DEVICE AND INDEX VALUE CALCULATION METHOD

TECHNICAL FIELD

The present invention relates to an information processing apparatus and an index calculation method for calculating an index for the growth state of a plant.

BACKGROUND

The growth state of a plant is evaluated by capturing an image of the plant and analyzing the captured image (refer to, for example, Patent Literature 1).

CITATION LIST

Patent Literature

Patent Literature 1: Japanese Patent No. 4026684

SUMMARY

Technical Problem

To accurately evaluate the growth state of a plant through image analysis, the dimensions of parts of the plant are to be referred to. To evaluate the growth state of a single fruit tree, a tarpaulin is placed behind the fruit tree and an image of the fruit tree is captured with a camera at a predetermined distance from the fruit tree (refer to Patent Literature 1). The obtained image can be used to measure the dimensions of parts of the fruit tree for accurate evaluation of the growth state of the fruit tree. However, capturing an image of the appearance of each plant with a camera is virtually impossible in a place where many plants are grown together.

One or more aspects of the present invention are directed to a technique for calculating an accurate index for the growth state of a plant without increasing a user load.

Solution to Problem

An information processing apparatus according to one aspect of the present invention includes a receiver that receives an input of a captured image obtained by capturing an image of a cultivation area of a plant including a rectangular area in a longitudinal direction of the rectangular area, a conversion factor calculator that calculates conversion factors at a plurality of positions in a depth direction in the captured image by determining a pixel count in a width direction of the rectangular area in the captured image input into the receiver at each of the plurality of positions in the depth direction and dividing an actual width of the rectangular area by the determined pixel count, and an index calculator that calculates an index for a growth state of the plant by analyzing the captured image using the conversion factors at the plurality of positions in the depth direction calculated by the conversion factor calculator. The depth direction in the captured image is parallel to the longitudinal direction of the rectangular area in the captured image (the vertical direction in the captured image).

More specifically, the information processing apparatus calculates the index for the growth state of a plant by calculating, using a captured image obtained by capturing an image of a cultivation area of a plant including a rectangular area in the longitudinal direction of the rectangular area, conversion factors at positions in the depth direction in the captured image indicating the width of the area corresponding to one pixel at each position in the depth direction in the captured image, and analyzing the captured image using the calculated conversion factors. The index calculated by the information processing apparatus is thus more accurate than an index obtained through analysis of the captured image performed without any information about a scale at each position in the depth direction. The information processing apparatus eliminates a user operation to capture an image of the appearance of each plant cultivated in the cultivation area. The information processing apparatus can thus calculate an accurate index for the growth state of a plant without increasing a user load.

The index calculator in the information processing apparatus may calculate the index through image analysis using artificial intelligence. The index calculated by the index calculator that performs image analysis using artificial intelligence may include a leaf area index (LAI). The rectangular area included in the plant cultivation area may be an area with two boundaries in the longitudinal direction of the rectangular area substantially parallel to each other. Thus, the rectangular area may include a ridge or a path in the cultivation area. The rectangular area may include an imaginary area defined by a plurality of poles arranged in the cultivation area (for example, poles regularly arranged in a greenhouse).

An index calculation method according to another aspect of the present invention includes preparing a captured image of a cultivation area of a plant including a rectangular area by capturing an image of the cultivation area in a longitudinal direction of the rectangular area with an imaging device, calculating conversion factors at a plurality of positions in a depth direction in the captured image by determining a pixel count in a width direction of the rectangular area in the prepared captured image at each of the plurality of positions in the depth direction and dividing an actual width of the rectangular area by the determined pixel count, and calculating an index for a growth state of the plant by analyzing the captured image using the calculated conversion factors at the plurality of positions in the depth direction.

More specifically, similarly to the above information processing apparatus, the index calculation method calculates the index for the growth state of a plant by analyzing a captured image using the conversion factors at positions in the depth direction. Thus, the index calculation method can also calculate an accurate index for the growth state of a plant without increasing a user load.

Advantageous Effects

The apparatus and the method according to the above aspects of the present invention calculate an accurate index for the growth state of a plant without increasing a user load.

DETAILED DESCRIPTION

An embodiment of the present invention will now be described with reference to the drawings.

Figure 1:
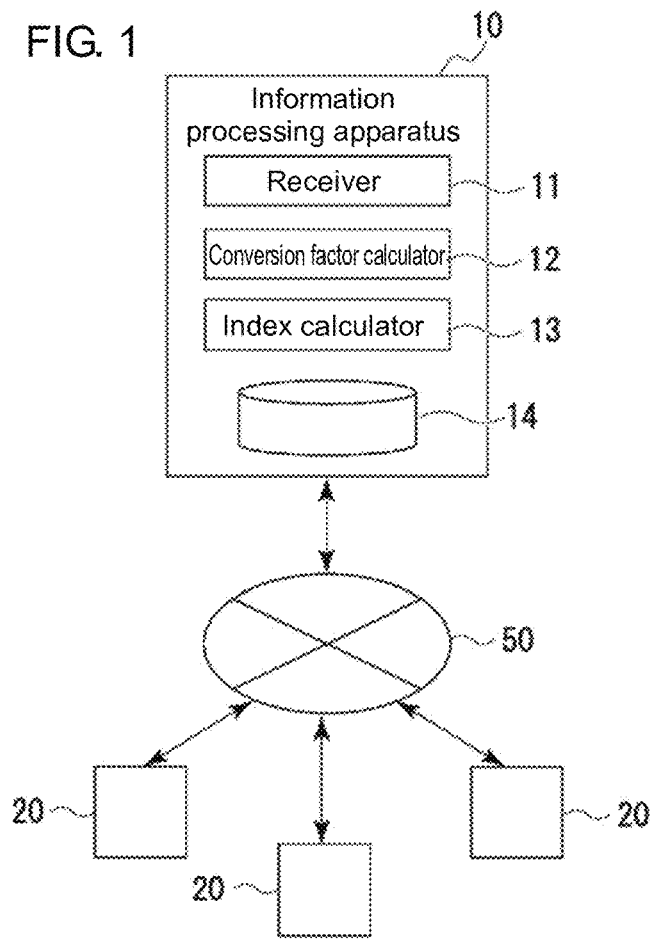
FIG. 1 is a diagram of an information processing apparatus according to one embodiment of the present invention, describing its structure and use.

FIG. 1 is a diagram of an information processing apparatus 10 according to one embodiment of the present invention, describing its structure and use.

The information processing apparatus 10 according to the present embodiment calculates a leaf area index (LAI) for a plant cultivation area of each user using a captured image of the plant cultivation area transmitted from a user terminal 20 of each user through the Internet 50. The user terminal 20 in the present embodiment is a smartphone including a program installed for using the information processing apparatus 10. The user terminal 20 may be any device that can transmit a captured image of a plant cultivation area to the information processing apparatus 10 through the Internet 50.

The information processing apparatus 10 is a relatively advanced computer programmed to function as an apparatus that includes a receiver 11, a conversion factor calculator 12, an index calculator 13, and a cultivation area management database 14. The receiver 11 corresponds to a receiver in an aspect of the present invention.

The cultivation area management database 14 is a database for managing information about the cultivation area of each user. The cultivation area management database 14 stores the actual width W of a path in the cultivation area of each user (hereafter, a path width W). More specifically, the cultivation area management database 14 stores, for a user who manages a single cultivation area, the path width W of the path in the single cultivation area, together with the identification information for the cultivation area. The cultivation area management database 14 stores, for a user who manages multiple cultivation areas, the path width W of the path in each of the cultivation areas, together with the identification information for each cultivation area.

The cultivation area management database 14 also stores authentication information (e.g., a user ID and a password) set for each user.

The receiver 11 performs user authentication, and then receives a captured image of the plant cultivation area transmitted from each user terminal 20 as a processing target. The captured image of the plant cultivation area transmitted from each user terminal 20 is a color image (refer to FIG. 3A) captured in the longitudinal direction of the path in the cultivation area by the user. Capturing an image of the cultivation area in the longitudinal direction of the path refers to capturing an image of the cultivation area with the capturing direction (the direction of the imaging device) substantially aligned with the longitudinal direction of the path. The captured image of the cultivation area transmitted to the information processing apparatus 10 may be captured from a position on the centerline of the path. However, the captured image of the cultivation area may be captured from a position slightly off the centerline of the path.

When receiving a captured image as a processing target, the receiver 11 also obtains the identification information for the cultivation area shown in the captured image currently transmitted from the user. The receiver 11 then reads, using the identification information, the path width W of the path in the cultivation area shown in the current captured image from the cultivation area management database 14. The receiver 11 instructs the conversion factor calculator 12 to process the current captured image (hereafter, a target captured image) using the read path width W (hereafter, a target path width W).

Figure 2:
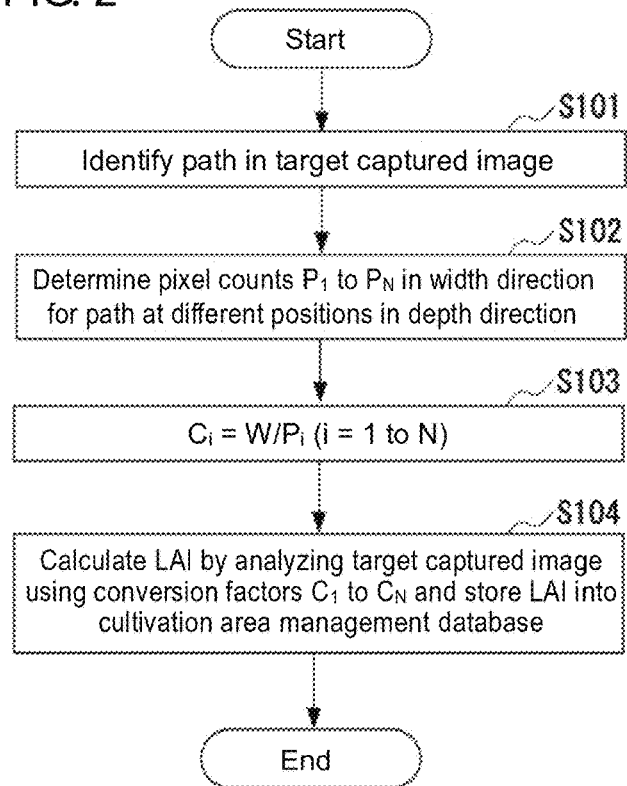
FIG. 2 is a flowchart of an index calculation process performed by a conversion factor calculator and an index calculator included in the information processing apparatus according to the embodiment.
Figure 3A:
FIGS. 3A and 3B are diagrams describing steps S101 and S102 in the index calculation process.
Figure 3B:
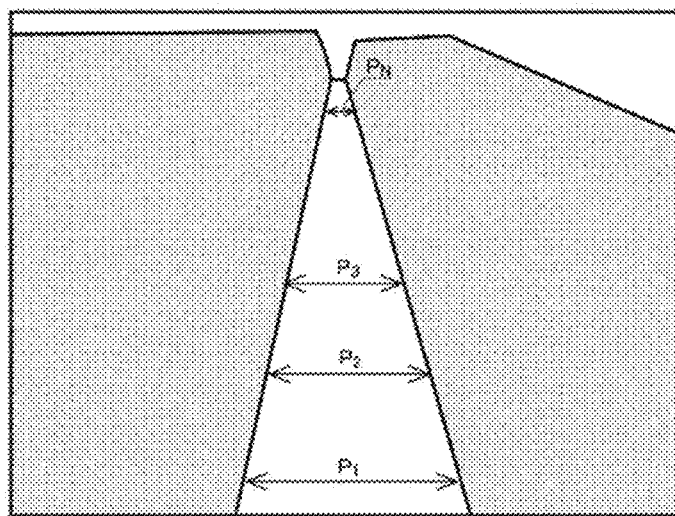

The functions of the conversion factor calculator 12 and the index calculator 13 will now be described with reference to FIGS. 2, 3A, and 3B. FIG. 2 is a flowchart of an LAI calculation process performed by the conversion factor calculator 12 and the index calculator 13. FIGS. 3A and 3B are diagrams describing steps S101 and S102 in the LAI calculation process.

The index calculator 13 (FIG. 1) has been trained to calculate an LAI for the cultivation area shown in the target captured image by analyzing the target captured image using artificial intelligence. The conversion factor calculator 12 calculates conversion factors used by the index calculator 13 for image analysis of the target captured image.

The conversion factor calculator 12 in the present embodiment performs the processing in steps S101, S102, and S103 in FIG. 2 (hereafter, a conversion factor calculation process) to calculate the conversion factors.

More specifically, in response to an instruction from the receiver 11 to process the target captured image, the conversion factor calculator 12 first identifies a path in the target captured image (step S101). In step S101, as schematically shown in FIGS. 3A and 3B, the conversion factor calculator 12 partitions the target captured image (FIG. 3A) into the green portions (the shaded portions in FIG. 3B) and the portions in other colors to identify the path. The conversion factor calculator 12 may use any other algorithm (for example, identifying a continuous area in earth color in the target captured image) to identify a path in step S101.

The conversion factor calculator 12, which has identified the path, determines the pixel counts $P_1$ to $P_N$ in a width direction for the identified path at different positions in the depth direction (step S102). The depth direction is a direction from the bottom to the top of the target captured image (a direction in which the distance from the camera to capture the target captured image increases) (refer to FIG. 3B).

The conversion factor calculator 12, which has determined the pixel counts $P_1$ to $P_N$, calculates conversion factors $C_1$ to $C_N$ by dividing the target path width W by the pixel counts $P_1$ to $P_N$ (step S103). As described (defined) above, the target path width W is the width of the path in the cultivation area shown in the target captured image read from the cultivation area management database 14 by the receiver 11.

Upon completion of the conversion factor calculation process (the processing in steps S101, S102, and S103) performed by the conversion factor calculator 12, the index calculator 13 analyzes the target captured image using the conversion factors $C_1$ to $C_N$ to calculate the LAI, and stores the LAI into the cultivation area management database 14 (step S104). In the processing in step S104, the index calculator 13 uses at least the conversion factors $C_1$ to $C_N$ to analyze the target captured image. More specifically, in the processing in step S104, the index calculator 13 uses at least the conversion factors $C_1$ to $C_N$ each indicating the width of the area corresponding to one pixel at each position in the depth direction for image analysis of the target captured image.

Upon completion of the processing in step S104, the index calculation process (the process in FIG. 2) for the current target captured image ends.

As described above, the information processing apparatus 10 according to the present embodiment calculates the LAI by calculating the conversion factors $C_1$ to $C_N$ each indicating the width of the area corresponding to one pixel at each position in the depth direction in the captured image of the plant cultivation area including a path and analyzing the captured image using the calculated conversion factors $C_1$ to $C_N$. The index calculated by the information processing apparatus 10 is thus more accurate than an index obtained through analysis of a captured image performed without any information about a scale at each position in the depth direction. The information processing apparatus 10 eliminates a user operation to capture an image of the appearance of each plant cultivated in the cultivation area. The information processing apparatus 10 can thus calculate an accurate index for the growth state of a plant without increasing a user load.

Modifications

The above information processing apparatus 10 may be modified variously. For example, the information processing apparatus 10 may calculate an index for the growth state of a plant other than the LAI. The information processing apparatus 10 may calculate multiple different indices for the growth state of a plant. The information processing apparatus 10 may perform image analysis without using artificial intelligence to calculate an index for the growth state of a plant.

The information processing apparatus 10 may use the width of a ridge in a cultivation area in place of the width of the path in the cultivation area. When the cultivation area includes another rectangular area (an area with two boundaries in the longitudinal direction substantially parallel to each other) other than the path, the information processing apparatus 10 may use the width of the other rectangular area in place of the width of the path. The cultivation area may include multiple regularly arranged poles. In such a case (for example, when plants are cultivated in a greenhouse), the width of an imaginary rectangular area defined by the poles may be used in place of the width of the path. In this case, the user captures an image of the cultivation area in the direction in which the poles form the imaginary rectangular area.

APPENDIX

An information processing apparatus (10), comprising:
a receiver (11) configured to receive an input of a captured image obtained by capturing an image of a cultivation area of a plant including a rectangular area in a longitudinal direction of the rectangular area;
a conversion factor calculator (12) configured to calculate conversion factors at a plurality of positions in a depth direction in the captured image by determining a pixel count in a width direction of the rectangular area in the captured image input into the receiver at each of the plurality of positions in the depth direction and dividing an actual width of the rectangular area by the determined pixel count; and
an index calculator (13) configured to calculate an index for a growth state of the plant by analyzing the captured image using the conversion factors at the plurality of positions in the depth direction calculated by the conversion factor calculator.

REFERENCE SIGNS LIST 10 information processing apparatus
11 receiver
12 conversion factor calculator
13 index calculator
14 cultivation area management database
20 user terminal
50 Internet

The invention claimed is:

1. An information processing apparatus, comprising:
a processor configured to implement:
a receiver configured to receive an input of a captured image obtained by capturing an image of a cultivation area of a plant including a path, the image being captured in a longitudinal direction of the path;
a conversion factor calculator configured to calculate conversion factors at a plurality of positions in a depth direction in the captured image by determining a pixel count in a width direction of the path in the captured image input into the receiver at each of the plurality of positions in the depth direction and dividing an actual width of the path by the determined pixel count; and
an index calculator configured to calculate an index for a growth state of the plant by analyzing the captured image using the conversion factors at the plurality of positions in the depth direction calculated by the conversion factor calculator.

2. The information processing apparatus according to claim 1, wherein
the index calculator calculates the index through image analysis using artificial intelligence.

3. The information processing apparatus according to claim 2, wherein
the index includes a leaf area index.

4. An index calculation method, comprising:
receiving a captured image of a cultivation area of a plant including a path, the captured image being an image of the cultivation area having been captured in a longitudinal direction of the path with an imaging device;
calculating conversion factors at a plurality of positions in a depth direction in the captured image by determining a pixel count in a width direction of the path in the prepared captured image at each of the plurality of positions in the depth direction and dividing an actual width of the path by the determined pixel count; and
calculating an index for a growth state of the plant by analyzing the captured image using the calculated conversion factors at the plurality of positions in the depth direction.

* * * * *